(12) United States Patent
Mugford et al.

(10) Patent No.: US 6,199,907 B1
(45) Date of Patent: Mar. 13, 2001

(54) METHOD AND APPARATUS FOR ABSORBING IMPACT ENERGY

(75) Inventors: Donald A. Mugford, New Baltimore; Kalu Uduma, Detroit; Richard A. O'Brien, Royal Oak, all of MI (US)

(73) Assignee: Chrysler Corporation, Auburn Hills, MI (US)

(*) Notice: Subject to any disclaimer, the term of this patent is extended or adjusted under 35 U.S.C. 154(b) by 0 days.

(21) Appl. No.: 09/193,140

(22) Filed: Nov. 17, 1998

(51) Int. Cl.[7] .............................. B60R 22/28; B60R 21/04
(52) U.S. Cl. ........................ 280/751; 280/805; 188/377
(58) Field of Search ................................. 280/751, 748, 280/805; 296/189; 188/371, 377

(56) References Cited

U.S. PATENT DOCUMENTS

| | | | |
|---|---|---|---|
| 3,599,757 | * 8/1971 | Takamatsu et al. | 188/371 |
| 3,779,595 | * 12/1973 | Suzuki et al. | 296/187 |
| 3,829,149 | * 8/1974 | Stevens | 296/189 |
| 4,098,525 | * 7/1978 | Schwanz et al. | 280/750 |
| 4,317,582 | * 3/1982 | Cottin et al. | 280/751 |
| 4,893,834 | * 1/1990 | Honda et al. | 280/751 |
| 5,549,327 | * 8/1996 | Rusche et al. | 280/751 |
| 5,549,349 | 8/1996 | Corporon et al. | 296/188 |
| 5,709,407 | 1/1998 | Stephens et al. | 280/751 |
| 5,857,734 | * 1/1999 | Okamura et al. | 296/189 |
| 5,938,273 | * 8/1999 | Williams et al. | 296/189 |
| 6,050,631 | * 4/2000 | Suzuki et al. | 296/189 |
| 6,059,342 | * 5/2000 | Kawai et al. | 296/39.1 |

OTHER PUBLICATIONS

Co–pending U.S. Serial No. 08/963,750, filed Nov. 4, 1997, entitled "Energy Absorbing B–Pillar Seatbelt Mounting Arrangement".

* cited by examiner

Primary Examiner—Paul N. Dickson
(74) Attorney, Agent, or Firm—Kenneth H. Maclean

(57) ABSTRACT

A pillar assembly for a motor vehicle includes a frame portion, an interior trim panel attached to the frame portion and an energy absorbing member attached to one of the frame portion and the interior trim panel. The energy absorbing member is disposed between the frame portion and the interior trim panel. The energy absorbing member is inelastically deformable and includes an open side and a closed side. The open side is oriented to face the other of the frame portion and the interior trim panel.

12 Claims, 3 Drawing Sheets

METHOD AND APPARATUS FOR ABSORBING IMPACT ENERGY

BACKGROUND OF THE INVENTION

1. Technical Field

The present invention generally relates to motor vehicles. More particularly, the present invention relates to a method and apparatus for absorbing impact energy during an impact collision of a motor vehicle.

2. Discussion

Federal Motor Vehicle Safety Standard (FMVSS 201) requirements scheduled for gradual introduction beginning with the 1999 model year specify maximum HIC (head injury criteria) for various points in the upper portions in the vehicle interior. In testing, the head of an anthropomorphic test device (ATD or test dummy) is impacted with the vehicle interior at a predetermined speed at each of the designated points. The HIC from the impact is derived with data obtained from a tri-axial accelerometer located on the ATD head.

Various arrangements have been proposed for absorbing energy at different impact points above the belt line. For example, commonly assigned U.S. Ser. No. 08/963,750, filed Nov. 4, 1997, discloses an apparatus for attaching a seat belt to a B-pillar which is capable of absorbing energy in the event the vehicle is involved in a side impact collision. The apparatus includes an anchorage assembly attached to a mounting plate. A D-ring is attached to the anchorage assembly and is operative for receiving a shoulder belt portion of the seat belt webbing. The anchorage assembly is preferably attached to the mounting plate at attachment points which are spaced apart on the mounting plate and are adapted to displace in an outboard direction when the anchorage assembly is subjected to a predetermined compression load. U.S. Ser. No. 08/963,750 is hereby incorporated by reference as if fully set forth herein.

It is also known to absorb impact energy within a vehicle occupant compartment through the addition of foam, such as polystyrene or the like. One such example is shown in commonly assigned U.S. Pat. No. 5,709,407, which is hereby incorporated by reference as if fully set forth herein. While often desirable for certain applications, foam energy absorbers are associated with disadvantages. For example, foam energy absorbers are relatively thick and necessarily intrude into the vehicle interior.

Thus, it is desirable to provide an improved apparatus for absorbing impact energy at interior points within a motor vehicle.

SUMMARY OF THE INVENTION

It is a general object of the present invention to provide an improved apparatus for absorbing energy in the event a vehicle occupant encounters the B-pillar or other structural component during a vehicle collision.

It is another object of the present invention to provide a reinforced B-pillar assembly adapted to absorb energy in the event a vehicle occupant encounters the assembly during a collision.

In one form, the present invention provides a pillar assembly for a motor vehicle. The pillar assembly includes a frame portion and an interior trim panel attached to the frame portion. The pillar assembly further includes an energy absorbing member attached to one of the frame portion and the interior trim panel. The energy absorbing member is interdisposed between the frame portion and the interior trim panel. The energy absorbing member is inelastically deformable and has an open side and a closed side. The open side is oriented to face the other of the frame portion and the interior trim panel.

In another preferred form, the present invention provides a method of absorbing energy during a side impact collision of a motor vehicle having a pillar assembly with a frame portion and an interior trim panel attached thereto. The method includes the general step of providing an energy absorbing member having an open side and a closed side. The method additionally includes the general step of attaching the closed side of the energy absorbing member to one of the frame portion and the interior trim panel so as to orient the open side toward the other of the frame portion and the interior trim panel. The method further comprises the general step of inelastically deforming the energy absorbing member.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
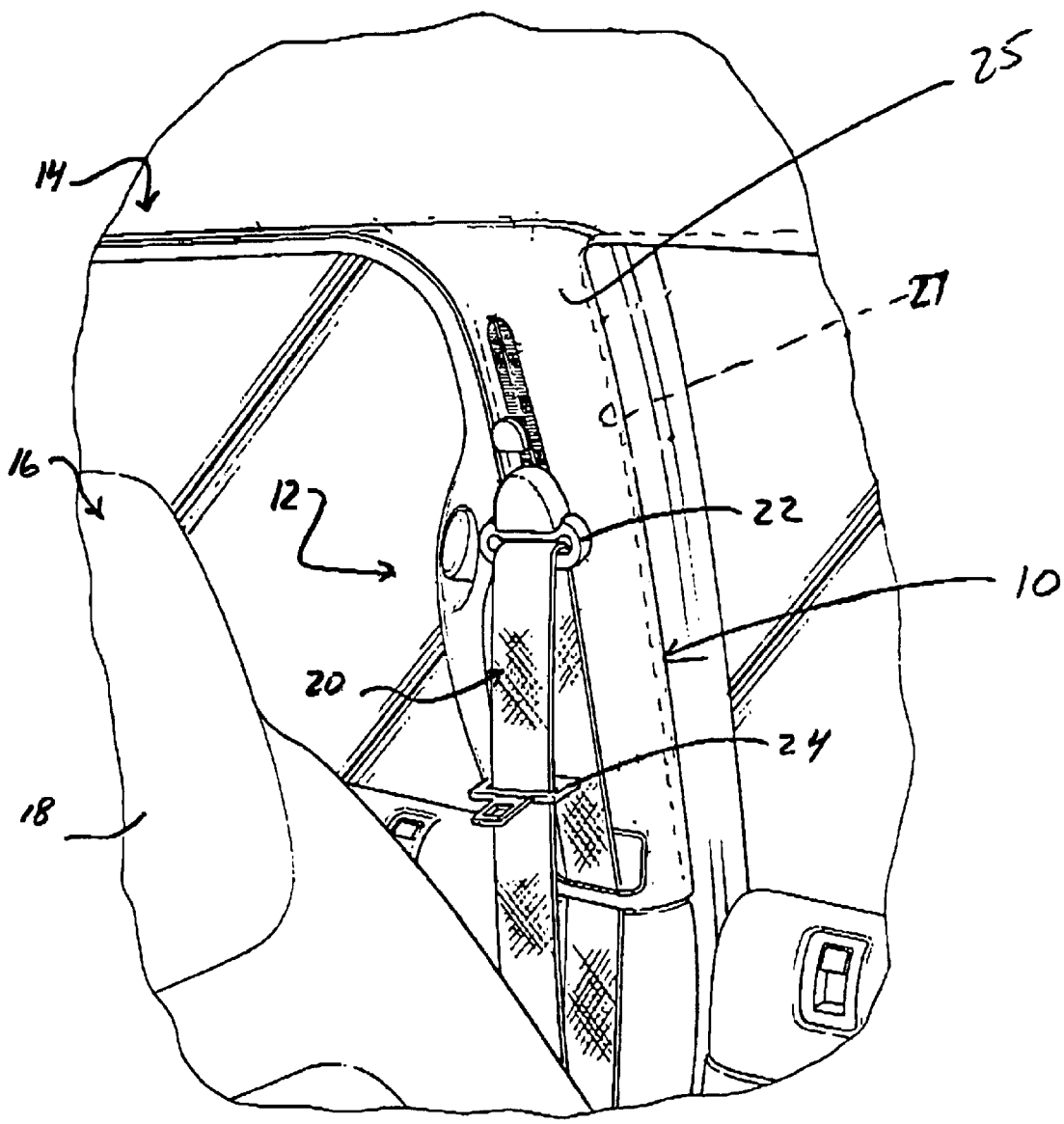
FIG. 1 is an environmental view illustrating a pillar assembly for absorbing energy during an impact collision constructed in accordance with the teachings of a preferred embodiment of the present invention.

With reference to the environmental view of FIG. 1, a B-pillar assembly constructed in accordance with the teachings of a preferred embodiment of the present invention is generally identified with reference numeral 10. The pillar assembly 10 is illustrated operatively associated with an occupant restraint system 12 of a motor vehicle 14. In the exemplary embodiment illustrated, the pillar assembly is a B-pillar assembly 10. However, it will be understood that the teachings of the present invention have applicability for other portions of the vehicle frame. Prior to addressing the construction and function of the pillar assembly 10, a brief understanding of the occupant restraint system 12 is warranted.

The pillar assembly 10 of the present invention is illustrated in FIG. 1 as applied to a three-point vehicle safety belt system 12 for restraining forward movement of a vehicle occupant in the event of deceleration of the vehicle 14 above a predetermined magnitude, such as occurs in a vehicle collision. It should be understood that the present invention could be applied to other safety belt systems. A vehicle seat is illustrated as a front driver seat 16 in the vehicle 14. The vehicle seat 16 is of conventional construction including a seat back 18.

The vehicle safety belt system 12 includes a length of seat belt webbing 20 which is extendable about the vehicle occupant (not shown) in a conventional manner. While not entirely shown, it will be understood that the seat belt webbing 20 conventionally includes one end anchored to the floor of the vehicle body, passes through a D-ring 22 positioned along the B-pillar assembly 10 and extends vertically downward to seat belt retractor (not shown) of known construction. A tongue assembly 24 is carried by the seat belt webbing 20 and is adapted to be received in a buckle secured to the vehicle body. When the tongue assembly 24 and buckle are joined, a shoulder belt section of the seat belt webbing 20 extends from the tongue assembly 24 diagonally across the seat back 18.

Figure 2:
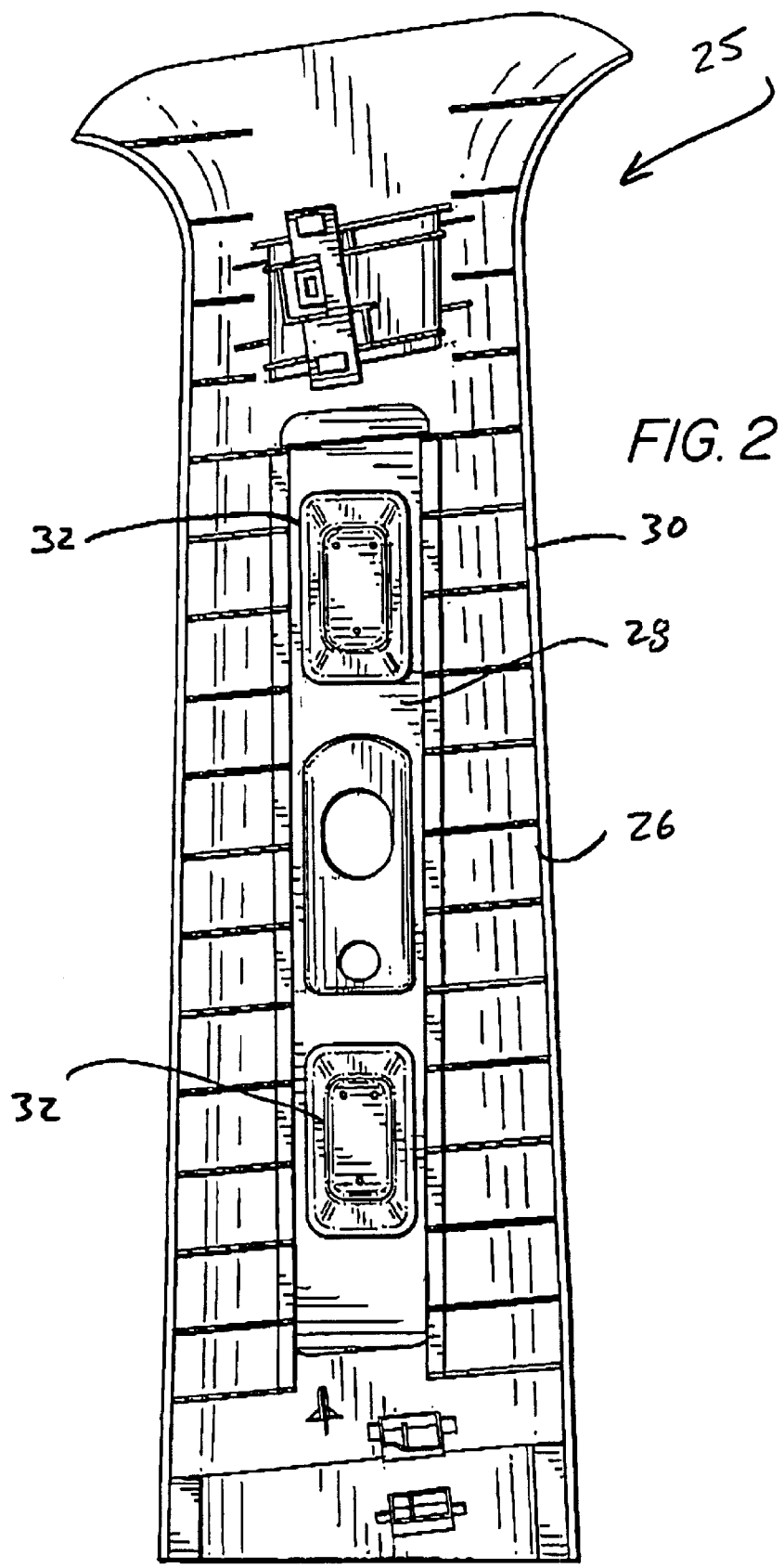
FIG. 2 is a rear view of the interior trim panel of FIG. 1.
Figure 3:
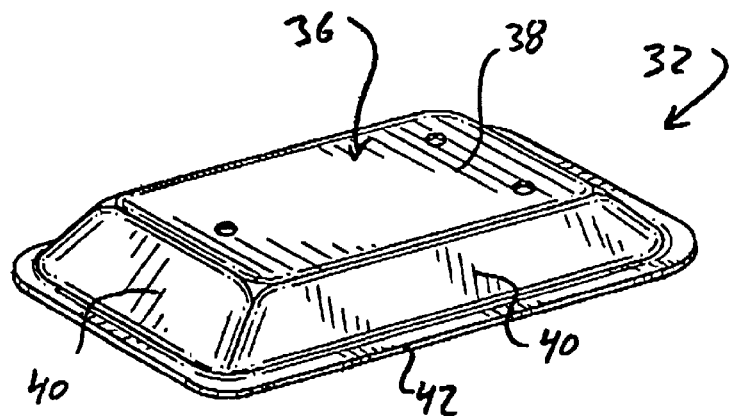
FIG. 3 is a perspective front view of one of energy absorbing members of FIG. 2.
Figure 4:
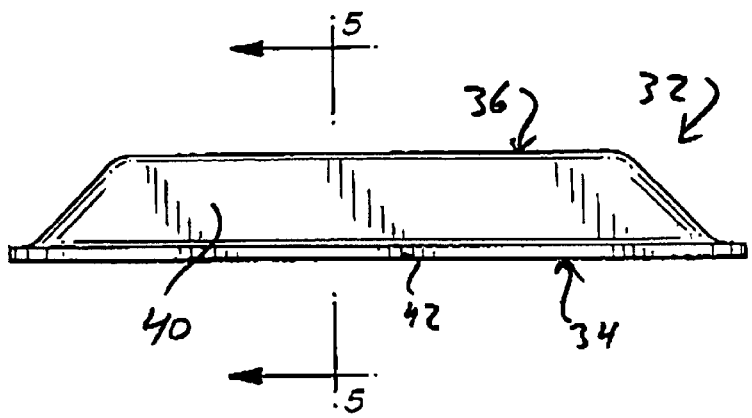
FIG. 4 is a side view of the energy absorbing member of FIG. 3.
Figure 5:
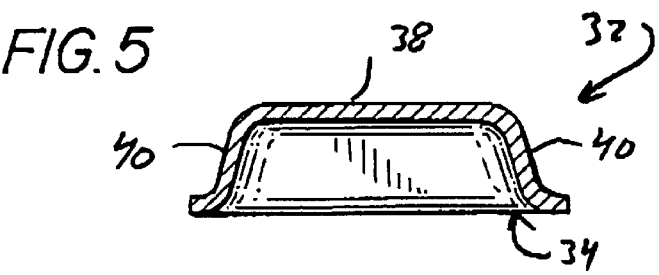
FIG. 5 is a cross-sectional view taken along the line 5—5 of FIG. 4.
Figure 6:
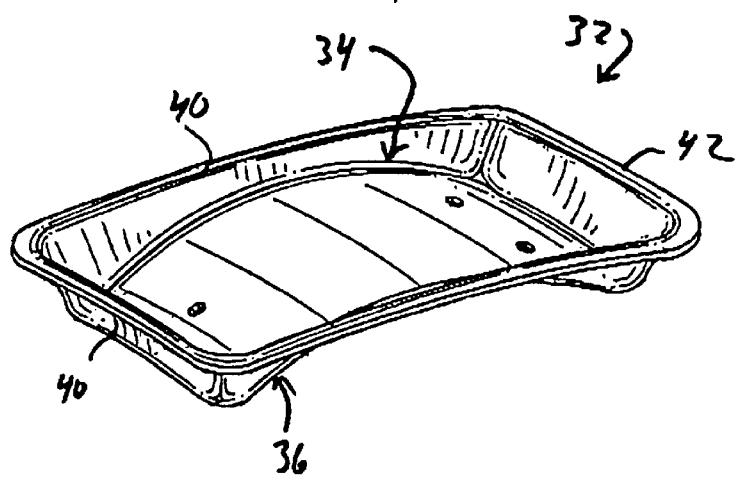
FIG. 6 is a perspective view of the energy absorbing member of the present invention shown following an impact to illustrate deformation thereof.

With continued reference to FIG. 1 and additional reference to FIG. 2, the pillar assembly 10 of the present invention is illustrated to generally include a trim panel assembly 25 and a frame portion 27 of the motor vehicle 14. The trim panel assembly 25 is illustrated to include a vertically translatable portion 28 and a stationary portion 30. The D-ring 22 is adapted to attach to the vertically translatable portion 28. One suitable manner for attachment is shown and described in commonly assigned U.S. Ser. No. 08/963,750, filed Nov. 4, 1997.

With continued reference to FIG. 2 and additional reference to FIGS. 3–6, the trim panel assembly 25 of the present invention is shown to include at least one energy absorbing member 32. In the exemplary embodiment illustrated, the trim panel assembly 25 is shown to include a pair of substantially identical impact absorbing members 32. Further in the exemplary embodiment, the impact absorbing members 32 are shown attached to the translatable portion 28 of the trim panel assembly 25. Alternatively, it will be understood that the energy absorbing member 32 may be attached to the stationary portion 34 of the trim panel assembly 25 or attached to the frame portion 27 of the motor vehicle 14 adjacent the trim panel assembly 25.

Each energy absorbing member 32 is shown to include an open side 34 and a closed side 36. In the exemplary embodiment illustrated, the energy absorbing member 32 includes a generally planar surface 38 and a plurality of sidewalls 40 extending therefrom. In one application, the generally planar surface 38 is rectangular and the adjacent sidewalls 40 of the plurality of sidewalls 40, which are four in number, are oriented substantially perpendicular to one another so as to cooperate with the generally planar surface 38 to define a box-like structure. In the exemplary embodiment, the sidewalls 40 taper outwardly from the generally planar surface 38. Further, in the preferred embodiment, the energy absorbing member 32 includes a circumferential flange 42 extending from the sidewalls 40. As shown most particularly in FIG. 2, the generally planar surface 38 is heat staked, adhesively or otherwise suitable attached to the trim panel assembly 25 so that the open side 34 of the energy absorbing member 32 faces the frame portion 27 of the vehicle 14.

In one application, the energy absorbing member 32 is unitarily constructed from steel having a gage of approximately 0.033 inches and has a length of approximately 58 mm, a width of approximately 29 mm and a depth of approximately 7.5 mm. Significantly, the width and depth are substantially greater than the depth. In this manner, a relatively large impact area is provided, but the member 32 does not occupy a significant depth so as to intrude into the interior of the motor vehicle 14. It will be understood that the particular dimensions employed are otherwise exemplary in nature only.

The method of the present invention is specifically directed to the absorbing of energy during a side impact collision of a motor vehicle 14 having a pillar assembly 10 with a frame portion 27 and an interior trim panel assembly 25 attached thereto. The method includes the general step of providing an energy absorbing member 32 substantially as disclosed above having an open side 34 and a closed side 36. The method additionally includes the step of attaching the closed side 36 to the trim panel assembly 25 such that the open side 34 is oriented toward the frame portion 27. The method additionally includes the step of inelastically deforming the energy absorbing member 32.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An energy absorbing assembly for a vertically extending structural pillar of a motor vehicle in combination with the structural pillar, the energy absorbing assembly comprising:

an interior trim panel secured to said structural pillar and having opposing inboard and outboard sides, the outboard side facing the structural pillar; and, an energy absorbing member secured to said outboard side of said interior trim panel and facing said structural pillar, said energy absorbing member being inelastically deformable, said energy absorbing member having a depth, a height, and a width, said depth being substantially less than said height and said width and having a generally planar surface and a plurality of four sidewalls extending therefrom, adjacent sidewalls of said plurality of four sidewalls being oriented substantially perpendicular to one another, wherein each of said sidewalls tapers from said generally planar surface;

whereby inelastic deformation of said energy absorbing member functions to absorb impact energy during a side impact collision.

2. The energy absorbing assembly of claim 1, wherein said energy absorbing member is unitarily constructed of steel.

3. The energy absorbing assembly of claim 1, wherein said generally planar surface is fixedly attached to said trim panel.

4. The energy absorbing assembly of claim 1, in combination with the vehicle and wherein said pillar comprises a B-pillar.

5. The energy absorbing assembly of claim 1, wherein said interior trim panel includes a stationary portion and a translatable portion mounted to said stationary portion for relative movement, said energy absorbing member mounted to said translatable portion.

6. The energy absorbing assembly of claim 1, wherein said structural pillar is elongated along a substantially vertical axis, said width and height are both oriented substantially perpendicular to said vertical axis and said width and height are both at least twice as great as said depth.

7. An energy absorbing assembly for a vertically extending structural pillar of a motor vehicle in combination with the structural pillar, the energy absorbing assembly comprising:

an interior trim panel secured to said structural pillar and having opposing inboard and outboard sides, the outboard side facing the structural pillar; and an energy absorbing member secured to said outboard side of said interior trim panel and facing said structural pillar, said energy absorbing member being inelastically deformable, said energy absorbing member having a depth, a height, and a width, said depth being substantially less than said height and said width and having a generally planar surface and a plurality of four sidewalls extending therefrom, adjacent sidewalls of said plurality of four sidewalls being oriented substantially perpendicular to one another, wherein each of said sidewalls tapers from said generally planar surface;

whereby inelastic deformation of said energy absorbing member functions to absorb impact energy during a side impact collision and wherein each said energy absorbing member further includes a circumferential flange connected to each of said sidewalls.

8. A pillar assembly for a motor vehicle, the pillar assembly comprising:

a structural pillar;

an interior trim panel interconnected to said structural pillar; and an energy absorbing member attached to said interior trim panel, said energy absorbing member disposed between said structural pillar and said interior trim panel member, said energy absorbing member being inelastically deformable and having an open side and a close side, said open side oriented to face said structural pillar, said energy absorbing member includes a generally Dlanar surface and a plurality of four sidewalls extending therefrom, adiacent sidewalls of said Dlurality of four sidewalls being oriented substantially perpendicular and wherein each of said sidewalls outwardly tapers from said generally planar surface.

9. The pillar assembly for a motor vehicle of claim 8, wherein said energy absorbing member is unitarily constructed of steel.

10. The pillar assembly for a motor vehicle of claim 8, wherein said pillar is a B-pillar.

11. The pillar assembly for a motor vehicle of claim 8, wherein said interior trim panel includes a stationary portion and a translatable portion mounted to said stationary portion for relative movement, said energy absorbing member mounted to said translatable portion.

12. A pillar assembly for a motor vehicle, the pillar assembly comprising:

a structural pillar;

an interior trim panel interconnected to said structural pillar; and an energy absorbing member attached to said interior trim panel, said energy absorbing member disposed between said structural pillar and said interior trim panel member, said energy absorbing member being inelastically deformable and having an open side and a close side, said open side oriented to face said structural pillar, said energy absorbing member includes a generally planar surface and a plurality of four sidewalls extending therefrom, adiacent sidewalls of said plurality of four sidewalls being oriented substantially perpendicular, wherein said energy absorbing member further includes a circumferential flange connected to each of said sidewalls.

* * * * *